US009215746B1

(12) United States Patent
Climaco et al.

(10) Patent No.: US 9,215,746 B1
(45) Date of Patent: Dec. 15, 2015

(54) SYSTEMS AND METHODS FOR DYNAMICALLY CONTROLLING ACTIVE-TO-DORMANT TIMERS IN RADIO ACCESS NETWORKS

(71) Applicant: Sprint Spectrum L.P., Overland Park, KS (US)

(72) Inventors: Jorge Toledo Climaco, Overland Park, KS (US); Syed U. Ahmed, Overland Park, KS (US); Feng Xie, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 658 days.

(21) Appl. No.: 13/626,654

(22) Filed: Sep. 25, 2012

(51) Int. Cl.
*H04Q 7/00* (2006.01)
*H04W 84/12* (2009.01)

(52) U.S. Cl.
CPC .................................... *H04W 84/12* (2013.01)

(58) Field of Classification Search
None
See application file for complete search history.

(56) References Cited

U.S. PATENT DOCUMENTS

| 8,654,694 B2 * | 2/2014 | Chang et al. ................. 370/311 |
| 8,712,422 B1 * | 4/2014 | Vondemkamp et al. ...... 455/450 |
| 8,780,715 B2 * | 7/2014 | Drucker ..................... 370/230.1 |
| 2003/0156537 A1 | 8/2003 | Soulhi et al. |
| 2010/0144363 A1 | 6/2010 | De Rosa et al. |
| 2013/0121161 A1 * | 5/2013 | Szab et al. .................... 370/241 |

\* cited by examiner

*Primary Examiner* — Duc C Ho

(57) ABSTRACT

Disclosed herein are systems and methods for dynamically controlling active-to-dormant timers in radio access networks (RANs). One embodiment takes the form of a method that involves a system detecting a triggering event, and responsively identifying a current access-channel occupancy (ACHO). The method further involves the system increasing an active-to-dormant timer for at least one access terminal when the identified current ACHO exceeds a first threshold, and decreasing an active-to-dormant timer for at least one access terminal when the identified current ACHO is less than a second threshold.

20 Claims, 4 Drawing Sheets

SYSTEMS AND METHODS FOR DYNAMICALLY CONTROLLING ACTIVE-TO-DORMANT TIMERS IN RADIO ACCESS NETWORKS

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. In a typical arrangement, a RAN provides access terminals with services such as voice, text messaging (using a protocol or service such as the Short Message Service (SMS)), and data communication, as examples.

The client-side devices are generally referred to herein as access terminals, though this term is intended to broadly encompass devices known as mobile stations, user equipment, mobile devices, wireless-communication devices, cell phones, smartphones, personal digital assistants, tablets, laptops, air cards, Universal Serial Bus (USB) dongles, and/or any other device or combination of devices capable of functioning as an access terminal according to this disclosure.

Typically, the wireless communications that are sent from the RAN to one or more access terminals are described as being sent on the "forward link," while those wireless communications that are sent from one or more access terminals to the RAN are described as being sent on the "reverse link." These communications are typically formatted and sent in accordance with a wireless-communication protocol, one example type of which is known as Code Division Multiple Access (CDMA). Moreover, CDMA networks that operate according to one or more industry specifications such as IS-95 and IS-2000 are often referred to as 1xRTT (or just "1x") networks, where 1xRTT stands for "Single Carrier Radio Transmission Technology."

Furthermore, some RANs operate according to a particular type of CDMA protocol known as EV-DO ("Evolution Data Optimized"). These RANs are generally configured to operate according to one or more versions of industry specification IS-856, and are designed to provide high-rate packet-data service, including Voice over Internet Protocol (IP) (VoIP) service, to access terminals using a technique that is known as time-division multiplexing (TDM) on the forward link and what is essentially 1x-CDMA technology on the reverse link.

More generally, RANs can be configured to operate according to any of numerous other wireless-communication protocols, some examples of which are WiMAX (IEEE 802.16), Long Term Evolution (LTE), time division multiple access (TDMA), Global System for Mobile Communications (GSM), Wi-Fi (IEEE 802.11), and the like. Furthermore, some ("hybrid") access terminals are equipped and arranged to be able to communicate according to multiple wireless-communication protocols (e.g., 1x CDMA and EV-DO).

In RANs that are of a type often known as wireless wide area networks (WWANs) (or cellular wireless networks), the entities with which access terminals communicate over the air interface are known by terms such as "base stations" and "access nodes," among others. These terms are sometimes used in different ways to refer to different entities. For example, the term "base station" is sometimes used to describe simply a device known as a base transceiver station (BTS), which contains the hardware, antennas, and so forth that actually conduct the over-the-air (OTA) portion of the communication with the access terminals on behalf of the RAN. At times, however, the term "base station" or "access node" is used to refer to a combination of (i) one or more BTSs and (ii) a device known as a "base station controller" (BSC) (or "radio network controller" (RNC)), which controls the BTS(s) and connects it (them) to the rest of the network.

In a typical scenario, an access terminal registers with a RAN via a particular BTS, and then operates in what is known as "idle mode" on a carrier frequency in a coverage area (e.g., a sector) provided by that BTS. If the access terminal is attempted to be contacted by another telephone, computer, or other communication device, the RAN will typically send the access terminal a page message via at least that particular BTS. The access terminal would typically respond by requesting and establishing communication on what is known as an air-interface traffic channel (or simply as a "traffic channel") and then conduct the relevant communication. In other instances, the access terminal is the initiator (perhaps when its user requests a webpage), in which case the access terminal sends the RAN an access-request message in order to request and establish communication on a traffic channel and then conduct the relevant communication.

When no activity (i.e., substantive communication) has taken place between the RAN and the access terminal for a certain amount of time, the RAN will typically reclaim the radio resources (including the traffic channel) that it had allocated to that access terminal, in order to make such resources available for other access terminals in the sector. This transition of the access terminal from (i) having radio resources allocated to it to (ii) not having radio resources allocated to it is often referred to as the access terminal going from "active" (or "active mode") to "dormant" (or "dormant mode"). The amount of time allowed by the RAN to elapse between the last use of a traffic channel and the reclaiming of that traffic channel (and perhaps other radio resources such as channel elements and the like) is typically determined by whatever value is set for a system (i.e., RAN) parameter typically known as the "active-to-dormant timer."

OVERVIEW

Existing approaches that implement an active-to-dormant timer are not adequate. A first such approach involves using a fixed active-to-dormant timer for all access terminals in a network, in a network sector, or on a carrier, as examples. However, this approach is not optimal for all situations. For example, if a user of an access terminal is repeatedly communicating via SMS messaging, but has lapses between messages that exceed the active-to-dormant timer, that access terminal may need to frequently request a new air-interface connection, which will lessen the quality of the user experience.

A second such approach involves reducing the active-to-dormant timer on a network-wide, coverage-area-wide, or carrier-wide basis when more than a threshold number of access requests are received via the access channel during a certain timeframe, and correspondingly increasing the active-to-dormant timer when a sufficiently low number of access requests are received via the access channel during a given timeframe. In times where the access channel is heavily loaded, this second approach will exacerbate the problem described in the preceding paragraph. That is, if the access channel is heavily loaded because (or at least partly because) access terminals are frequently just barely exceeding the active-to-dormant timer and having to therefore immediately send a new access request on the access channel, then reducing the active-to-dormant timer in that situation will only make the problem worse.

The present systems and methods address the above-described drawbacks as well as others by implementing a new and non-obvious manner of dynamically varying the active-to-dormant timer based on a current access-channel occupancy level, in particular by reducing the active-to-dormant timer when the access-channel occupancy is relatively low and increasing the active-to-dormant timer when the access-channel occupancy is relatively high.

One embodiment takes the form of a method carried out by a wireless-communication-capable computing system that comprises at least one wireless-communication interface, at least one processor, and data storage containing program instructions executable by the at least one processor for carrying out the method. The method involves detecting a triggering event, and responsively identifying a current access-channel occupancy (ACHO). The method further involves increasing an active-to-dormant timer for at least one access terminal when the identified current ACHO exceeds a first threshold and decreasing an active-to-dormant timer for at least one access terminal when the identified current ACHO is less than a second threshold.

Another embodiment takes the form of a computing system that includes a wireless-communication interface, a processor, and data storage containing program instructions executable by the processor for carrying out at least those functions described just above.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

1. EXAMPLE ARCHITECTURE a. Example Communication System

Figure 1:
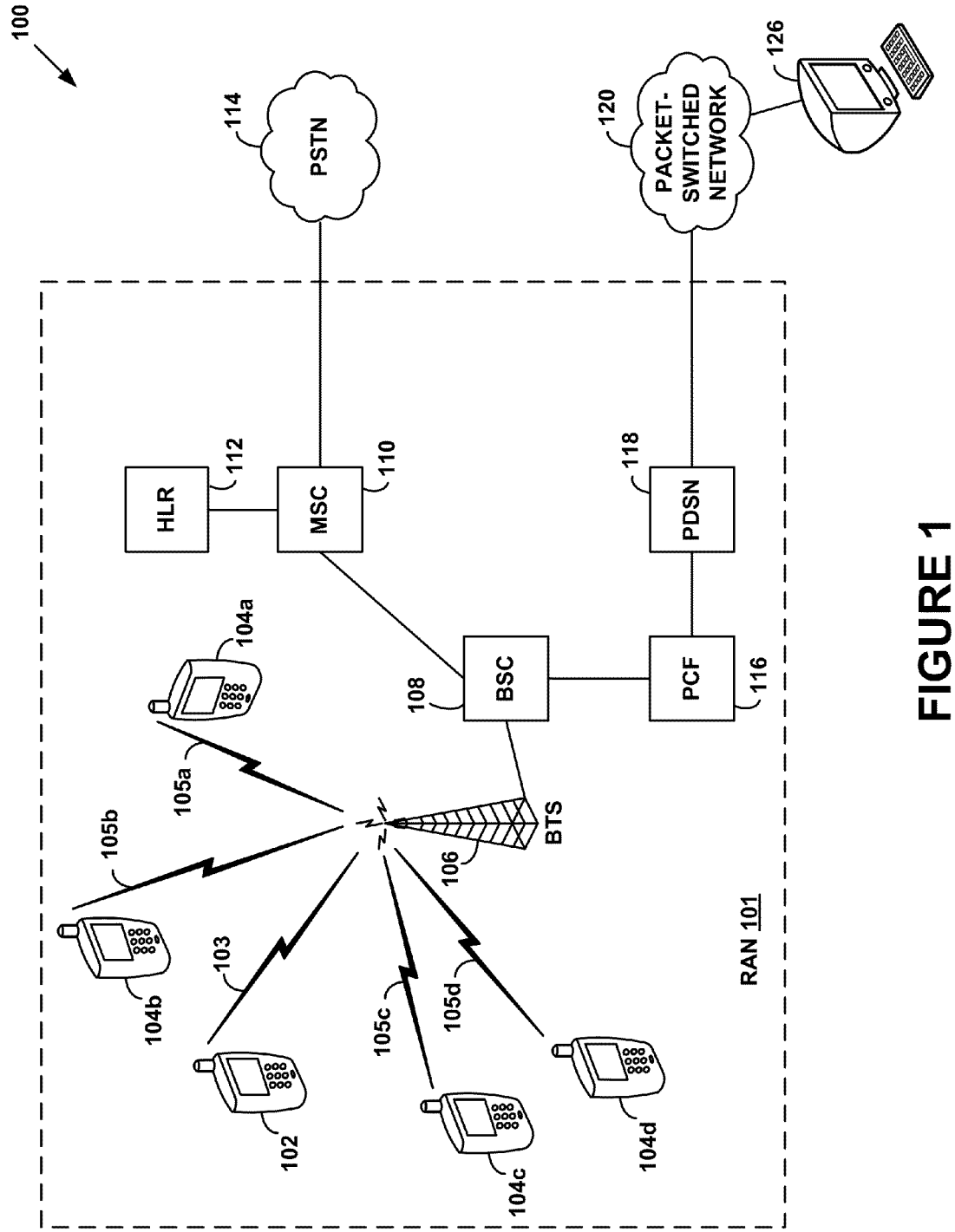
FIG. 1 is a simplified block diagram of an example of a communication system that includes a depiction of an example of a radio access network (RAN)

FIG. 1 depicts a communication system 100 that includes a RAN 101 communicatively connected via separate communication paths with both a public switched telephone network (PSTN) 114 and a packet-switched network 120, which in turn is connected to an example endpoint, depicted in FIG. 1 as a computer 126. FIG. 1 also depicts RAN 101 in additional detail. In particular, RAN 101 is shown as including an example access terminal (AT) 102 communicating over an air interface 103 with a BTS 106, and further including example ATs 104a-d communicating with BTS 106 over air interfaces 105a-d, respectively.

BTS 106 is connected to and controlled by BSC 108, which in turn is connected to mobile switching center (MSC) 110, which among other functions provides connectivity and access to a circuit-switched transport network such as the PSTN 114 to provide services such as voice calls. Also connected to MSC 110 is a home location register (HLR) 112, which supports mobility-related aspects of subscriber services, including dynamic tracking of subscriber registration location and verification of service privileges, among other examples. As shown, BSC 108 is also connected (by way of a packet control function 116) with a packet data serving node (PDSN) 118, which provides connectivity and access to a packet-switched network such as network 120, which may be the Internet.

b. Example Network Device

Figure 2:
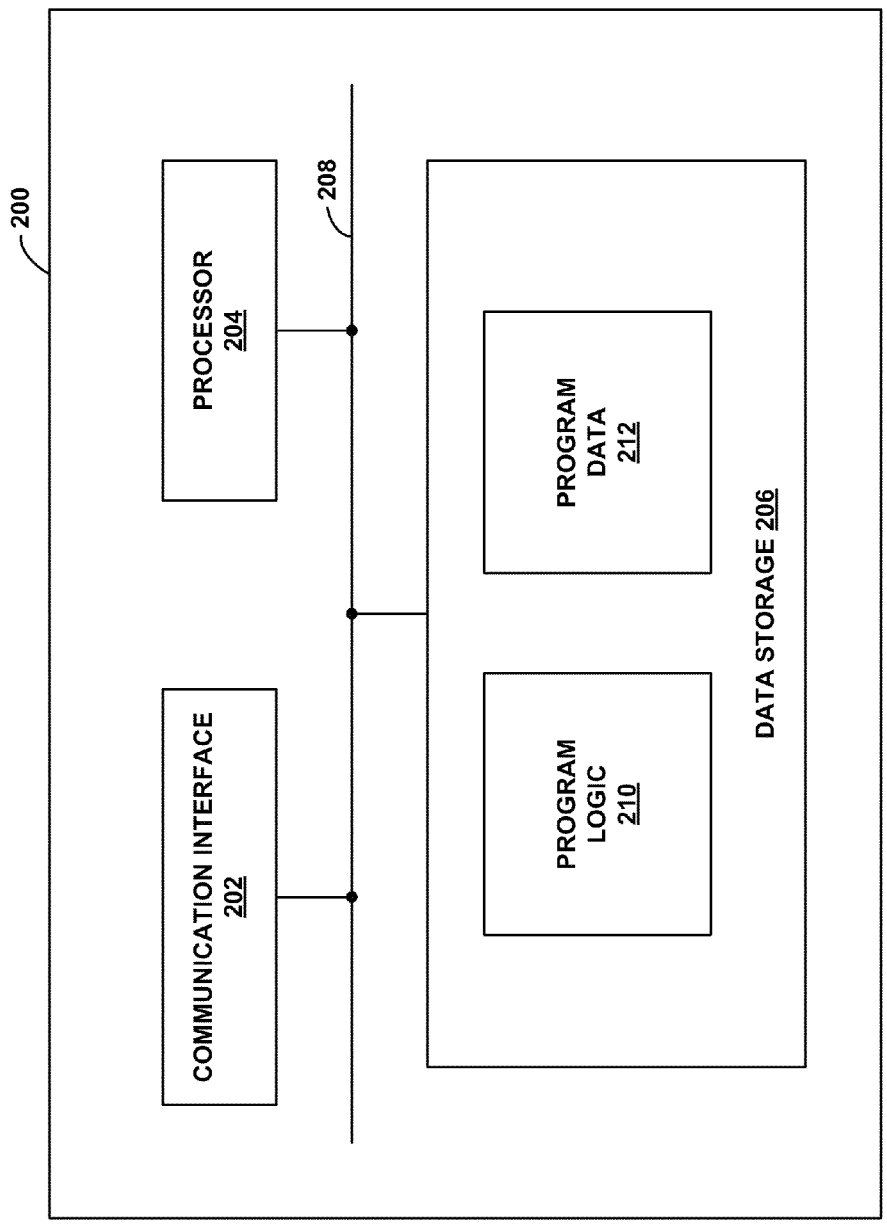
FIG. 2 is a simplified block diagram of an example communication device.

Those skilled in the art will appreciate that there can be numerous specific implementations of a network device that may be used in connection with at least one embodiment of the method described herein. By way of example, FIG. 2 is a simplified block diagram depicting functional components of an example network device or system 200 that may be arranged to carry out network-side functions described herein.

The example network device 200 may be representative of an AT 102, 104a, 104b, 104c, 104d, BTS 106, BSC 108, BTS 106 integrated with BSC 108, and/or some other entity in FIG. 1, as examples. As shown in FIG. 2, network device 200 includes a communication interface 202, a processor 204, and a data storage 206, all of which may be coupled by a system bus 208 or other mechanism. The data storage 206 may further include program logic 210 and program data 212. In addition, the network device may also include external storage, such as magnetic or optical disk storage, although this is not shown in FIG. 2. In addition, network device 200 may include additional features such as a global positioning system (GPS) receiver, camera, and/or battery power, etc. These components may be arranged to support conventional operation of the ATs, BTSs, BSCs, etc. that are illustrated in FIG. 1. Certain aspects of network device 200 relevant to the functions discussed herein are discussed briefly below.

Communication interface 202 may be or include any combination of hardware and/or software that mobile device 200 uses to communicate in a wireless and/or wired manner with one or more other entities. As such, communication interface 202 may include an Ethernet interface, one or more chipsets suitable for wireless communication, and/or one or more other components suitable for engaging in data communication.

Processor 204 may comprise multiple (e.g., parallel) processors, such as a general-purpose microprocessor and/or a discrete digital signal processor. Data storage 206 may take various forms, in one or more parts, such as a non-volatile storage block and/or a removable storage medium. Data storage 206 may store program logic 210 and program data 212. Program logic 210 may be executable by processor 204 to carry out various functions described herein. Program data 212 may include ACHO data, ACHO threshold data, and/or one or more other of any types of data deemed suitable for a given implementation.

2. EXAMPLE OPERATION a. Introduction

Figure 3:
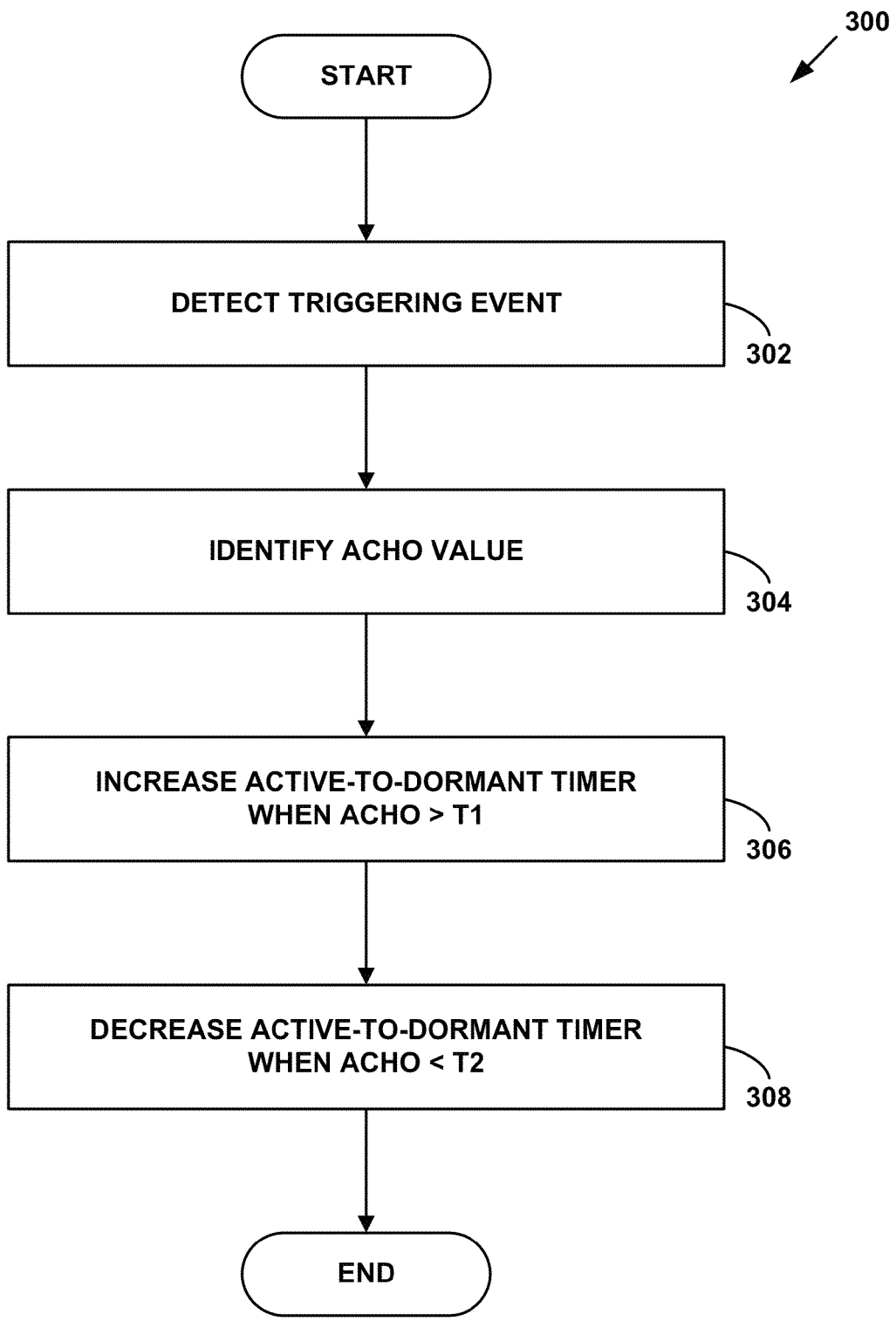
FIG. 3 is a flowchart of an example of a method in accordance with at least one embodiment.

FIG. 3 is a simplified block diagram of a method that may be carried out in accordance with at least one embodiment. In particular, FIG. 3 depicts a method 300 that could be carried out by a RAN (i.e., by one or more RAN entities, servers, computers, devices, and the like) and/or by an access terminal, as examples. Method 300 may include one or more operations, functions, and/or actions as illustrated by the blocks depicted in FIG. 3. Furthermore, although the blocks are shown in a sequential order, the functions represented by these blocks could instead be carried out in parallel and/or in a different order than that described herein, unless context clearly dictates otherwise, such as clearly indicating a sequential dependency, as one example. Also, the various blocks may be combined into fewer blocks, divided into additional blocks, and/or removed based upon the specifics of a given implementation.

Furthermore, the flowcharts provided herein show functionality and operation of example embodiments. In this regard, each block may represent a module, a segment, and/or a portion of program code that includes one or more instructions executable by a processor for carrying out specific functions or steps. The program code may be stored on any type of non-transitory computer-readable medium or media, such as a storage device that includes a disk and/or a hard drive, as examples. The computer-readable medium may include media arranged to store data for short periods of time, such as register memory, processor cache, and/or random access memory (RAM), as examples. The computer-readable medium may also or instead include media arranged to serve as secondary or more persistent long-term storage, such as read only memory (ROM), optical disks, magnetic disks, and/or compact-disc ROM (CD-ROM), as examples. The computer-readable media may also or instead include any other volatile and/or non-volatile storage system or systems deemed suitable for a given implementation.

b. Example RAN-Implemented Method

For purposes of illustration, method 300 will first be described as being carried out by a RAN, and will thereafter be described as being carried out by an access terminal. It should be understood, however, that the descriptions herein need not be limited to the RAN or access terminal. Similarly, it should be understood that one or more of the steps described herein as being implemented by the RAN could be implemented by the access terminal, and vice versa, and/or perhaps by a cooperative effort between the two, among other possibilities.

Method 300 may be used to manage radio resources (e.g., traffic channels) in a network by causing access terminals to release resources more quickly when ACHO is low and allowing access terminals to hold on to resources for a longer period of time when ACHO is high. The determination of when to take which approach may be made by periodically identifying the current ACHO value and comparing that current ACHO value to one or more thresholds. If the ACHO value is greater than a first threshold, an active-to-dormant timer may be increased. If the ACHO value is less than a second threshold, the active-to-dormant timer may be decreased.

Method 300 begins at block 302 by detecting a triggering event. The triggering event may be directly related to how frequently the ACHO value is identified. For example, the triggering event may be the elapsing of a periodically resetting timer, which may be set to elapse after a predetermined time period, such as 10 seconds. After the predetermined period of time has elapsed, the RAN may identify the current ACHO value at block 304. The ACHO value may be represented as a percent, whole number, fraction, decimal number, etc., and is indicative of a current load on the access channel. In some examples, the ACHO value may be determined by directly measuring an ACHO value, or perhaps by reading an ACHO value from data storage. In other examples, the ACHO value may be estimated, perhaps based in whole or in part on a number of air-interface connections in a network or network sector. An example of estimating an ACHO value is discussed in more detail below with reference to FIG. 4.

Method 300 continues at block 306 with increasing an active-to-dormant timer for at least one access terminal when the identified current ACHO exceeds a first threshold (T1), which may represent a static or dynamic threshold level stored in memory or other data storage. An ACHO value that is greater than T1 generally indicates that a relatively high number of access terminals have recently requested establishment of an air-interface connection on a traffic channel. In such cases, competition for available traffic channels is high and, for a given access terminal, successfully reconnecting on a traffic channel may therefore be more difficult. Accordingly, in this circumstance, method 300 involves increasing the active-to-dormant timer such that more time will be allowed to elapse before an access terminal's traffic channel is taken away. As described, the active-to-dormant timer may be specific to a device, sector, carrier, network, etc.

In an example embodiment, T1 is set to 40%. When the ACHO is greater than or equal to 40%, the active-to-dormant timer is increased. The amount that the active-to-dormant timer is increased may be based on a current active-to-dormant timer, a default active-to-dormant timer, an average active-to-dormant timer, and/or one or more other factors. Thus, for example, if the default active-to-dormant timer is 25 seconds, it may be increased by 0.5 seconds, and may continue to be increased by 0.5 seconds (or other duration(s)), perhaps until a maximum active-to-dormant timer is reached. Thus, if the default active-to-dormant timer is 25 seconds, the active-to-dormant timer may be increased until it reaches 35 seconds or 40 seconds, as examples. The active-to-dormant timer may remain at the maximum active-to-dormant timer duration until a certain amount of time has expired, until the ACHO is below a second threshold (T2), or perhaps until the occurrence of one or more other triggering events.

Method 300 continues at block 308 with decreasing an active-to-dormant timer for at least one access terminal when the identified current ACHO is less than a second threshold (T2), which may represent a static or dynamic threshold level stored in memory or other data storage, and which may be equal to or less than T1 in various different embodiments. An ACHO value that is less than T2 generally indicates that a relatively low number of access terminals have recently requested establishment of an air-interface connection on a traffic channel. In such cases, competition for available traffic channels is low and, for a given access terminal, successfully reconnecting on a traffic channel may therefore be relatively easy. In this circumstance, method 300 involves decreasing the active-to-dormant timer such that less time will be allowed to elapse before an access terminal's traffic channel is taken away. As stated, the active-to-dormant timer may be specific to a device, sector, carrier, network, etc.

In an example embodiment, T2 is set to 38%. When the ACHO is less than 38%, the active-to-dormant timer is decreased. The amount that the active-to-dormant timer is decreased may be based on a current active-to-dormant timer, a default active-to-dormant timer, an average active-to-dormant timer, and/or one or more other factors. Thus, for example, if the default active-to-dormant timer is 25 seconds, it may be decreased by 0.5 seconds, and may continue to be decreased by 0.5 seconds (or other duration(s)), perhaps until a minimum active-to-dormant timer is reached. Thus, if the default active-to-dormant timer is 25 seconds, the active-to-dormant timer may be decreased until it reaches 2 seconds or 5 seconds, as examples. The active-to-dormant timer may remain at the minimum active-to-dormant timer duration until a certain amount of time has expired, until the ACHO is above T1, or perhaps until the occurrence of one or more other triggering events.

In some instances, the system may keep the active-to-dormant timer at its current level until at least the next evaluation. For example, when the ACHO is equal to or greater than 38% and also less than 40%, the active-to-dormant timer may be maintained at its current value. Accordingly, the method may continue until the active-to-dormant timer expires or a triggering event is detected. By dynamically adjusting (and sometimes maintaining) the active-to-dormant timer in this manner, the systems and methods more efficiently manage resource allocation.

c. Example Access-Terminal-Implemented Method

Method 300 may optionally be carried out by an access terminal. At block 302, the triggering event detected by the access terminal may be or include receiving a message, such as a quick-configuration message, that the RAN may periodically broadcast. Once the triggering event is detected, the access terminal may proceed at block 304 to identify an ACHO value. In some examples, the access terminal may identify the ACHO value by receiving a stored ACHO value from the RAN. In other examples, the access terminal may identify the ACHO value using one or more estimation techniques, such as those described in connection with FIG. 4.

Figure 4:
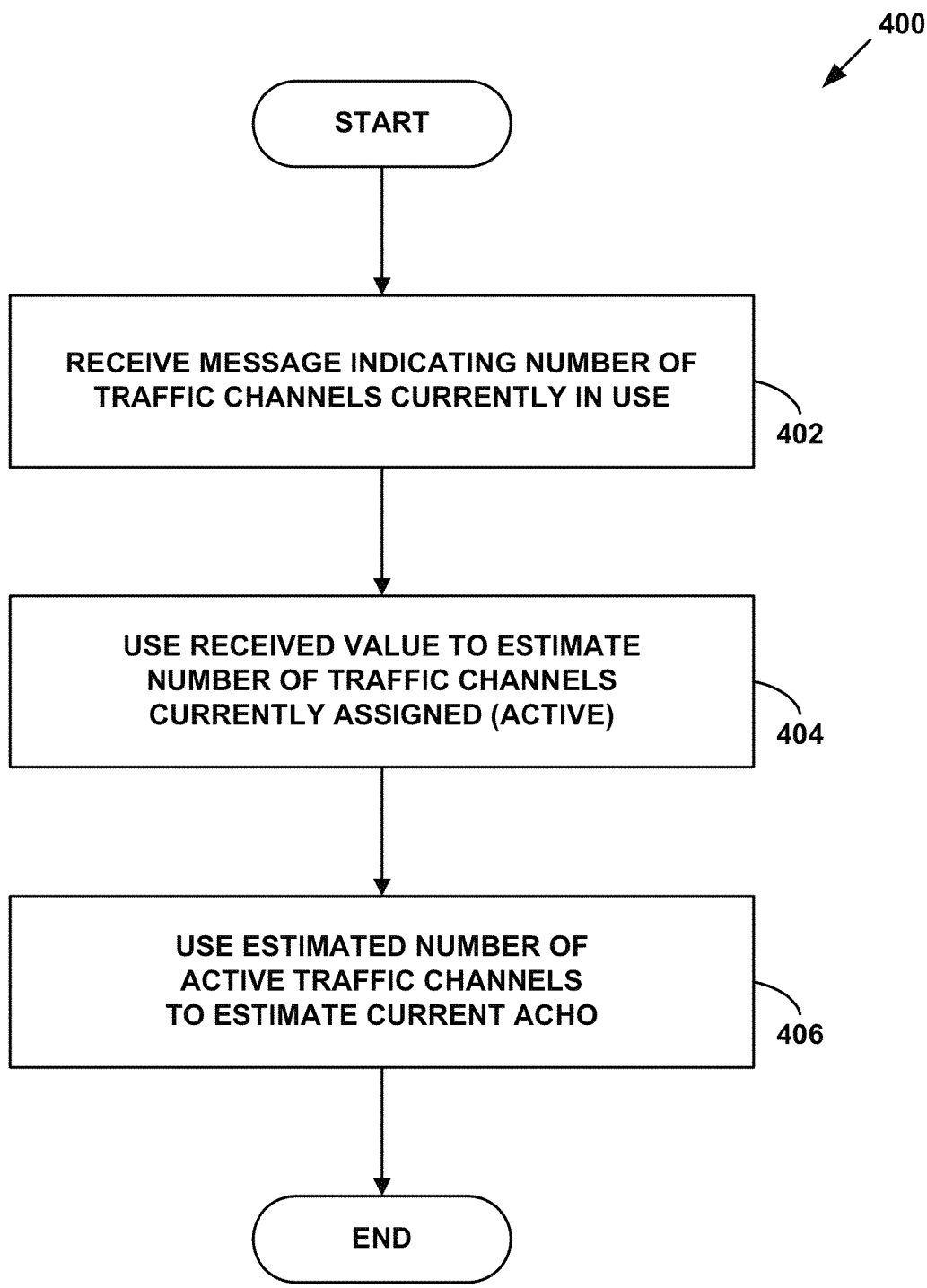
FIG. 4 is a flowchart of an example of a sub-process that may be carried out in accordance with at least one embodiment.

As stated above, FIG. 4 depicts a method that may be carried out in order to estimate a current ACHO value in accordance with at least one embodiment. The method 400 begins at block 402 with receiving a message indicating a number of traffic channels that are currently in use (for example, in a given coverage area on a given carrier frequency). In one or more embodiments, the message is a quick-configuration message, which may include a forward-traffic-channel (FTC) valid indicator that indicates the number of traffic channels that are currently being used to actually transmit data from an access terminal to the RAN.

Method 400 continues at block 404 by using the received value to estimate the number of active traffic channels that are currently assigned in the coverage area. A traffic channel is assigned (i.e., "active") when the access terminal is transmitting data and also when the access terminal has stopped transmitting data but the active-to-dormant timer has not yet elapsed. In some embodiments, the carrying out of block 404 may involve applying a stored correlation (e.g., a multiplier) to the received value, to produce an estimated number of traffic channels that are currently assigned (i.e., active) in the coverage area.

Such a correlation, a number representing such a correlation, a multiplier, etc. may be provisioned into the memory of access terminals and may be updated from time to time as deemed suitable in a given context. Furthermore, such correlations or multipliers may be derived using historical data that empirically compares the number of traffic channels in actual use to the number of traffic channels currently assigned, though certainly other approaches could be used instead or as well. As such, the correlation or multiplier used in each coverage area in a network may be specific to that coverage area. Furthermore, different correlations may be derived for, and then used with respect to, different days of the week, times of day, and so on.

Method 400 continues at block 406 with using the estimated number of active traffic channels that are currently assigned to estimate the current ACHO. In some embodiments, this involves applying to the estimated number of traffic channels currently assigned a correlation (e.g., a multiplier)—that may be based on historical data in that coverage area, at that time of day, on that day of the week, and/or according to some other delineation(s) of data—that facilitates making a determination as to what value of ACHO would be expected at differing levels of number of traffic channels currently assigned. As to this correlation and/or one or more of the others described herein and/or one or more others used in a given embodiment, any suitable mechanism (e.g., a multiplier, a table correlating ranges of one metric or condition with expected values of a second metric or condition, etc.) could be used in a given implementation.

In some embodiments, the carrying out of block 406 may involve the carrying out of two sub-steps as part of using an estimated number of traffic channels currently assigned to estimate a current ACHO. In particular, using suitable correlative mechanisms as described above, the carrying out of block 406 may involve using an estimated number of active traffic channels to estimate a number of access requests that have been made on the access channel over a preceding time period of a certain predetermined duration (such as 1 hour, as an example), and then using that estimated number of access requests over that time period to estimate the current ACHO. And certainly other approaches could be used as well, as those described above are provided by way of example and not by way of limitation.

Furthermore, with respect to any two or more correlative mechanisms, such as multipliers, that exhibit a transitive property, the multipliers could be multiplied with each other in advance of using or even receiving a value such as the number of traffic channels actually in use at a given moment. Thus, using the above description as an illustrative example, the two (or three) multipliers used to go from an actual received value (the number of traffic channels actually in use) to the ultimate estimated value (the current ACHO). Thus, in a given embodiment, an access terminal may receive that value, apply an amalgamated multiplier to it, and thereby derive the ultimate estimated value. And certainly other approaches could be used as well, as deemed suitable and/or convenient in a given implementation.

Referring back to FIG. 3, the identified ACHO value may then be used to determine whether to increase, decrease, or maintain the active-to-dormant timer for the access terminal that is carrying out method 300 in this example. In some cases, a given access terminal may carry out these functions and then inform the RAN and/or one or more other access terminals of the result, and that may directly or indirectly result in a similar (or different) adjustment (or maintenance of a current value) of an active-to-dormant timer used by one or more other access terminals. And certainly other approaches could be used as well in various embodiments.

3. CONCLUSION

While some example embodiments have been described above, those of ordinary skill in the art will appreciate that numerous changes to the described embodiments could be made without departing from the scope and spirit of the claims.

We claim:

1. A method carried out by a wireless-communication-capable computing system that comprises at least one wireless-communication interface, at least one processor, and data storage containing program instructions executable by the at least one processor for carrying out the method, which comprises:
   detecting a triggering event, and responsively identifying a current access-channel occupancy (ACHO);
   increasing an active-to-dormant timer for at least one access terminal when the identified current ACHO exceeds a first threshold; and
   decreasing an active-to-dormant timer for at least one access terminal when the identified current ACHO is less than a second threshold.

2. The method of claim 1, wherein the system is embodied in an access terminal.

3. The method of claim 1, wherein the system is embodied in one or more network-side entities in a radio access network (RAN).

4. The method of claim 1, wherein the first threshold is equal to the second threshold.

5. The method of claim 1, wherein the first threshold is greater than the second threshold.

6. The method of claim 1, wherein decreasing the active-to-dormant timer is conditioned upon the active-to-dormant timer being greater than a minimum value.

7. The method of claim 1, wherein increasing the active-to-dormant timer is conditioned upon the active-to-dormant timer being less than a maximum value.

8. The method of claim 1, wherein the triggering event includes the elapsing of a periodically resetting timer.

9. The method of claim 1, wherein the triggering event comprises receiving a message.

10. The method of claim 9, wherein the message is a quick-configuration message having a forward-traffic-valid indicator.

11. The method of claim 9, wherein the message indicates a number of traffic channels that are currently in use.

12. The method of claim 11, further comprising using the number of traffic channels that are currently in use to estimate a number of traffic channels that are currently assigned.

13. The method of claim 12, wherein identifying the current ACHO comprises using the estimated number of traffic channels that are currently assigned to estimate the current ACHO.

14. The method of claim 1, wherein decreasing the active-to-dormant timer comprises decreasing the active-to-dormant timer by 0.5 seconds.

15. The method of claim 1, wherein increasing the active-to-dormant timer comprises increasing the active-to-dormant timer by 0.5 seconds.

16. A computing system comprising:
   a wireless-communication interface;
   a processor; and
   data storage containing program instructions executable by the processor for carrying out a set of functions, wherein the set of functions includes:
      detecting a triggering event, and responsively identifying a current access-channel occupancy (ACHO);
      increasing an active-to-dormant timer for at least one access terminal when the identified current ACHO exceeds a first threshold; and
      decreasing an active-to-dormant timer for at least one access terminal when the identified current ACHO is less than a second threshold.

17. The computing system of claim 16, wherein decreasing the active-to-dormant timer is conditioned upon the active-to-dormant timer being greater than a minimum value.

18. The computing system of claim 16, wherein decreasing the active-to-dormant timer comprises decreasing the active-to-dormant timer by 0.5 seconds.

19. The computing system of claim 16, wherein identifying the current ACHO comprises deriving a value from data received by an access terminal.

20. The computing system of claim 16, wherein identifying the current ACHO comprises receiving a value from a radio access network (RAN).

* * * * *